March 21, 1961 C. ORT 2,975,693
FILTER COMPENSATION FOR PHOTOGRAPHIC CAMERAS
Filed June 12, 1959
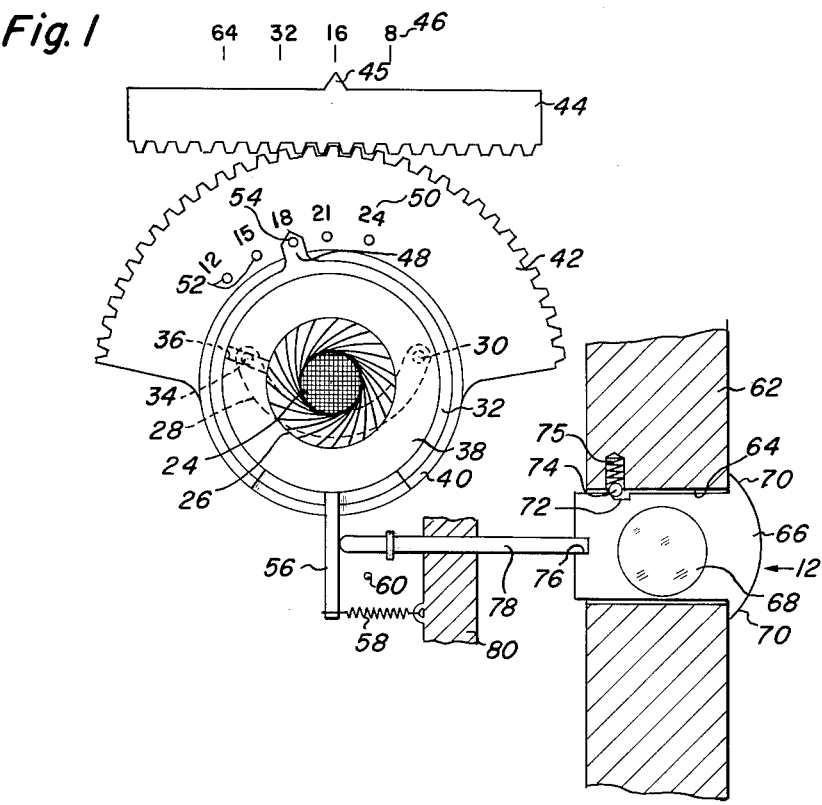
CARL ORT
INVENTOR.
BY R. Frank Smith
Robert W. Hampton
ATTORNEYS United States Patent Office
2,975,693
Patented Mar. 21, 1961

2,975,693

FILTER COMPENSATION FOR PHOTOGRAPHIC CAMERAS

Carl Ort, Stuttgart-Bad Cannstatt, Germany, assignor to Eastman Kodak Company, Rochester, N.Y., a corporation of New Jersey Filed June 12, 1959, Ser. No. 819,931

11 Claims. (Cl. 95—64)

The present invention relates to a still camera or a motion picture camera with photoelectric exposure control whose measuring instrument controls the lens diaphragm semiautomatically or fully automatically and in the front of whose photocell a light-controlling means is adjustable to compensate for various exposure factors, including taking-lens filters.

A number of devices have been designed to compensate for the prolongation indexes of various filters placed over the taking lenses of cameras having automatic exposure control. For example, a so-called star diaphragm may be placed in front of the photocell to allow only a fraction of the scene light to illuminate the photocell, this fraction being a function of the type of taking-lens filter used. Both the filter and the star diaphragm may expediently be mounted in a single frame so that they can be inserted and removed together. Though this arrangement has the advantage that one can never use the wrong star diaphragm for a particular filter, it is inconvenient to provide each filter with its own star diaphragm.

A primary object of the present invention is to provide a simple device to automatically compensate for the prolongation factors of various filters placed over the taking lens of a still or motion picture camera of the aforementioned type.

In one embodiment of the invention a light-controlling means in front of the photocell of the exposure control system, which means is adjusted in dependence on (a) film speed and (b) shutter speed or frame frequency, is also adjusted automatically according to the prolongation factor of a filter placed in front of the taking lens. The type of the light-controlling means for the photocell of the measuring instrument is of no significance for the invention; it is merely important that such light-controlling means be automatically adjusted in dependence on the prolongation factors of selected filters.

Further objects of the invention will be apparent from the following description, reference being made to the accompanying drawings, wherein:

Fig. 1 is a front view of a preferred embodiment of the invention and the related elements of a camera; and Fig. 2 is a schematic side view of the invention and its related camera elements.

Referring to Fig. 2, a typical camera employing the invention, disclosed for illustration as a motion picture camera having fully automatic exposure control, includes a lens axis 10 on which are arranged a filter mechanism 12, a taking-lens system 14, a diaphragm vane 16, a shutter mechanism 18 and a photosensitive surface such as a film strip 20. The diaphragm vane 16 is attached to and rotates with the coil 22 of an electrical measuring instrument which is energized by a photocell 24. The photocell is disposed for illumination by scene light through light-controlling means illustrated as an iris diaphragm 26. The instrument coil 22 positions vane 16 and thereby controls the admission of light to film 20 as a function of the energization of cell 24 by scene light, as fully disclosed, for example, in U.S. Patent No. 2,209,639.

The blades of the photocell diaphragm 26, one of which is illustrated at 28 in Fig. 1, are supported at one end by respective pins 30 in corresponding bores of a first ring 32 and are supported at the opposite end by respective pins 34, which are guided in corresponding slots 36 of a second ring 38. Rings 32 and 38 are pivoted coaxially to each other and are supported by a third ring 40, which is integral with a toothed segment 42. Segment 42 engages a rack 44 having a pointer 45 whose position opposite a scale 46 indicates the frame frequency or shutter speed.

Ring 32 has a resilient pointer 48 which cooperates with a film-speed scale 50 on the toothed segment 42 of ring 40. Each film-speed index number of scale 50 has a corresponding recess 52 which, in cooperation with a detent 54 on the resilient pointer 48, locks rings 32 and 40 together when pointer 48 is set to a particular film-speed index number.

Ring 38 has an arm 56 engaging a spring 58 which urges ring 38 counterclockwise until arm 56 comes to rest against a fixed stop pin 60.

In a frame member 62 extending above and below the axis of the taking lens 14, a slot 64 opens toward the outside of the camera and is adapted to receive filter mounts such as 66, each of which, when inserted into slot 64, places a filter, such as 68, on the axis of the taking lens. Filter mount 66 has near its outer end a pair of lateral projections 70 which strike frame member 62 when the filter is properly positioned on the axis of the taking lens. On one lateral edge of each filter mount a recess 72 is provided which cooperates with a ball detent 74 and spring 75 in frame member 62 for yieldably retaining an inserted filter in its proper position.

On the front edge of each filter mount a notch or other control surface 76 is provided. A pin 78 is supported for displacement along its axis in a frame member 80 and has one end extending into cooperation with arm 56 of ring 38 while the other end of pin 78 extends into the slot 76 of the filter mount. The invention operates as follows.

After the film is inserted in the camera, pointer 48 of ring 32 is set to the film-speed index number of scale 50 which corresponds to the inserted film. During this adjustment, i.e., while ring 32 is being rotated, ring 38, whose arm 56 rests against stop pin 60 due to the tension of spring 58, maintains its position. Therefore slots 36 in ring 38, as well as pins 34 of diaphragm blades 28, maintain their angular positions, while pins 30 of the diaphragm blades 28 rotate with ring 32, whereby the opening of iris diaphragm 26 is either increased or decreased, according to the direction in which ring 32 is rotated. The diaphragm is further adjusted by displacement of rack 44 to compensate for frame frequency or shutter speed. A displacement of rack 44 effects a rotation of toothed segment 42 and thus of ring 40. Since by the locking engagement of detent 54 with a selected recess 52 rings 32 and 40 are coupled with each other, pins 30 of blades 28 are rotated relative to pins 34 so that the iris diaphragm opening is either enlarged or decreased. It is therefore seen that rack 44 and pointer 48 constitute input members to a first differential mechanism whose combined output constitutes a first input to a second differential mechanism comprising the double-pivoted diaphragm blades 28. The filter adjustment constitutes a second input to the diaphragm-blade (the second) differential mechanism.

When a filter mount 66 is inserted into slot 64 of frame member 62 the inner surface of notch 76 engages the righthand end of pin 78 and displaces that pin leftwardly. Therefore the lefthand end of pin 78 engages arm 56 of ring 38 and rotates that ring against the tension of spring 58. Since ring 32 and thus pins 30 of blades 28 do not change their positions upon rotation of ring 38, and since pins 34 are moved because of their engagement with slots 36, the opening of iris diaphragm 26 is decreased by insertion of a filter mount. The extent to which the opening decreases depends upon the depth of notch 76 in the filter mount. This depth is predetermined, as to each filter mount, so that the effected decrease in the opening of the iris diaphragm corresponds to the prolongation factor of the inserted filter.

When the filter mount is inserted until projections 70 engage member 62, ball detent 74, which is retained upward during insertion of the filter mount, against the tension of spring 75, engages notch 72 of the filter mount, thereby securing the latter in its inserted position. Notch 72 is expediently designed so that the filter mount is always cammed toward the inner portion of the camera by the pressure of ball 74.

If in place of the motion picture camera shown in the drawing, a still camera is to be equipped with the device according to the invention, then the scale 46 of frame frequency must of course be replaced by a shutter-speed scale.

The invention has been described in detail with particular reference to preferred embodiments thereof, but it will be understood that variations and modifications can be effected within the spirit and scope of the invention as described hereinabove and as defined in the appended claims. It is particularly understood that the invention is applicable to cameras having semiautomatic exposure control, such as "matched pointer" systems, as well as to cameras having fully automatic exposure control as illustrated in the accompanying drawing.

It is further understood that the invention is applicable also to cameras, especially still cameras, wherein the shutter speed rather than the diaphragm opening is automatically or semiautomatically controlled, in which case, diaphragm values may be set into the differential mechanism for regulating the photocell exposure.

I claim:

1. In a photographic camera having a taking lens, a taking-lens diaphragm, and means for regulating said diaphragm as a function of scene brightness, said means including a photocell disposed for illumination by scene light, the combination comprising: adjustable light-controlling means disposed on said camera for variably exposing said photocell to scene light; means for adjusting said light-controlling means to vary the exposure of said photocell to scene light, said adjusting means comprising a first input member movable under manual control for adjusting said light-controlling means to compensate for changes in a first exposure factor, and a second movable input member differentially coupled to said first input member for adjusting said light-controlling means to compensate for the prolongation factor of any of a plurality of taking-lens filters; means adapted to receive a filter mount; a filter mount insertable into said receiving means, said mount carrying a filter having predetermined light-attenuating properties, said filter being aligned with said taking lens upon insertion of said mount into said receiving means, said mount having a control surface uniquely related to the light-attenuating properties of said filter; and means cooperating with said filter mount and said second input member for sensing said control surface to move said second input member in proportion to the light attenuating properties of said filter.

2. The combination defined in claim 1, wherein said control surface comprises a notch whose depth is uniquely related to the light-attenuating properties of the filter carried by said mount, and wherein said sensing means comprises a member engaged by said notch upon insertion of said mount into said receiving means.

3. The combination defined in claim 1, with detent means associated with said receiving means for yieldably retaining said mount in its inserted position.

4. The combination defined in claim 1, with: spring means normally urging said second input member in a predetermined direction; and a fixed stop for retaining said second input member at a limit position at the extreme of its movement in said predetermined direction in the absence of an inserted filter mount.

5. The combination defined in claim 1, wherein said light-controlling means comprises an iris diaphragm.

6. The combination defined in claim 5, wherein said iris diaphragm has a plurality of blades, each blade being coupled to both of said first and second input members.

7. In a photographic camera having a taking lens, a taking-lens diaphragm, and means for regulating said taking-lens diaphragm as a function of scene brightness, said means including a photocell disposed for illumination by scene light, the combination comprising: first differential means having first and second input members movable under manual control to compensate for changes in respective first and second exposure factors and having a single output member movable as a function of the differential movement of said input members; second differential means having first and second movable input members and output means adjustable as a function of the differential movement of said last-named input members for variably exposing said photocell to scene light; means coupling the output member of said first differential means to the first input member of said second differential means; a filter mount carrying a filter characterized by a predetermined degree of light attenuation; means for positioning said mount to align said filter with said taking lens; a control surface on said mount having a configuration uniquely related to the light-attenuating characteristic of said filter; and means cooperating with said filter mount and with the second input member of said second differential means for sensing said control surface to move said last-named input member in proportion to the light-attenuating characteristic of said filter, thereby to adjust the exposure of said photocell in compensation for scene light attenuated by said filter.

8. The combination defined in claim 7, with: means including the first input member of said first differential means for indicating a selected film speed; and means including the second input member of said second differential means for indicating a selected frame frequency.

9. The combination defined in claim 7, with: means including the first input member of said first differential means for indicating a selected film speed; and means including the second input member of said second differential means for indicating a selected shutter speed.

10. The combination defined in claim 7, wherein said second differential means comprises an iris diaphragm having a plurality of blades, each blade being coupled to the output member of said first differential means and to the second input member of said second differential means.

11. In a photographic camera having a taking lens for focusing an image of a viewed scene onto a photosensitive surface, and having means for regulating the exposure of said surface as a function of scene brightness, said means including a photocell disposed for illumination by scene light, the combination comprising: adjustable light-controlling means disposed on said camera for variably exposing said photocell to scene light; means for adjusting said light-controlling means to vary the exposure of said photocell to scene light, said adjusting means comprising a first input member movable under manual control for adjusting said light-controlling means to compensate for changes in a first exposure factor, and a second movable input member differentially coupled to said first input member for adjusting said light-controlling means to compensate for the prolongation factor of any of a plurality of taking-lens filters; means adapted to receive a filter mount; a filter mount insertable into said receiving means, said mount carrying a filter having predetermined light-attenuating properties, said filter being aligned with said taking lens upon insertion of said mount into said receiving means, said mount having a control surface uniquely related to the light-attenuating properties of said filter; and means cooperating with said filter mount and said second input member for sensing said control surface to move said second input member in proportion to the light-attenuating properties of said filter.

References Cited in the file of this patent

UNITED STATES PATENTS

| | | |
|---|---|---|
| 2,058,531 | Tuttle | Oct. 27, 1936 |
| 2,058,562 | Buckey et al. | Oct. 27, 1936 |
| 2,194,031 | Riszdorfer | Mar. 19, 1940 |
| 2,893,302 | Durst | July 7, 1959 |